United States Patent
Russ (10) Patent No.: US 9,415,880 B2
(45) Date of Patent: Aug. 16, 2016

(54) ACTUATOR FOR RAT DEPLOYMENT

(71) Applicant: Hamilton Sundstrand Corporation, Windsor Locks, CT (US)

(72) Inventor: David Everett Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 315 days.

(21) Appl. No.: 14/182,138

(22) Filed: Feb. 17, 2014

(65) Prior Publication Data

US 2015/0096437 A1    Apr. 9, 2015

Related U.S. Application Data

(60) Provisional application No. 61/888,829, filed on Oct. 9, 2013.

(51) Int. Cl.
| | |
|---|---|
| F15B 15/04 | (2006.01) |
| B64D 41/00 | (2006.01) |
| F15B 15/14 | (2006.01) |
| F15B 15/26 | (2006.01) |

(52) U.S. Cl.
CPC ............. B64D 41/007 (2013.01); F15B 15/04 (2013.01); F15B 15/1476 (2013.01); F15B 15/262 (2013.01)

(58) Field of Classification Search
CPC ............. B64D 41/007; F05B 2220/31; F05D 2220/34
USPC ............................. 92/63, 130 A, 130 D, 135
See application file for complete search history.

(56) References Cited

U.S. PATENT DOCUMENTS

| | | | |
|---|---|---|---|
| 4,240,332 A | 12/1980 | Deutsch | |
| 4,392,556 A | 7/1983 | Deutsch | |
| 4,742,976 A | 5/1988 | Cohen | |
| 5,820,074 A | 10/1998 | Trommer et al. | |
| 6,902,043 B2 * | 6/2005 | Plantan | B60T 17/08 188/170 |
| 7,416,392 B2 | 8/2008 | Russ | |
| 2011/0236218 A1 | 9/2011 | Russ et al. | |
| 2012/0297924 A1 | 11/2012 | Lang et al. | |
| 2013/0292509 A1 | 11/2013 | Russ et al. | |
| 2013/0292510 A1 | 11/2013 | Russ et al. | |

* cited by examiner

*Primary Examiner* — Thomas E Lazo
(74) *Attorney, Agent, or Firm* — Kinney & Lange, P.A.

(57) ABSTRACT

An assembly includes an actuator assembly having a housing, a piston positioned at least partially within the housing and movable relative to the housing for an overall actuation stroke, a first spring operatively engaged between the piston and the housing to provide actuation biasing force therebetween, a second spring operatively engaged with the piston, and a spring guide. The spring guide is operatively engaged with the first spring and operatively engaged with the piston via a sliding connection. The spring guide is further configured to limit a stroke of the first spring such that the first spring contributes actuation biasing force between the piston and the housing for only a fractional portion of the overall actuation stroke of the piston.

15 Claims, 4 Drawing Sheets

ACTUATOR FOR RAT DEPLOYMENT

CROSS-REFERENCE TO RELATED APPLICATION(S)

This application claims priority to U.S. Provisional Patent Application Ser. No. 61/888,829 entitled "ACTUATOR FOR RAT DEPLOYMENT," filed Oct. 9, 2013, which is hereby incorporated by reference in its entirety.

BACKGROUND

The present disclosure relates generally to actuators, and more particularly to spring-actuated deployment actuators suitable for use with ram air turbines (RATs) in aerospace applications.

Modern aircraft often include a secondary or emergency power system that can provide power in the event that power is unavailable from a primary power system. RATs are commonly used for secondary or emergency power systems to provide electrical and/or hydraulic power. A typical RAT is deployable in flight by opening suitable doors or hatches in the aircraft's fuselage. The RAT presents a rotatable turbine to oncoming airflow, which rotates the turbine. Rotational energy (torque) from the turbine is then transmitted to a suitable power conversion device (e.g., generator, pump, etc.) that converts that rotational energy to a desired form for use by the aircraft.

RATs commonly include an actuator assembly with a spring bias mechanism and a hydraulic cylinder. The spring bias member can provide force to move the RAT from a stowed position to a deployed position, when a stow-lock mechanism is released. Larger RATs often utilize an actuator having an external spring, while smaller RATs often utilize an actuator with an internal spring assembly. In addition to moving the RAT itself, the actuator typically opens one or more associated doors or hatches along the aircraft fuselage. The hydraulic cylinder can be used to provide a snubbing function during an end-of-travel portion of the deployment stroke, and/or to retract the RAT from the deployed position to the stowed position.

During deployment, any air loads and/or gravitational (G) loads acting on the system, including during unusual flight conditions, must be overcome to allow the RAT to fully deploy. Some installations, such as those in or near the nose of the aircraft, have curved RAT deployment doors that may create significant opposing air loads roughly mid-way through the deployment process, as the curved doors interact with oncoming airflows.

Current RAT actuators commonly use a combination of disk springs (i.e., Belleville washers) and a soft spring rate helical spring located inside a piston cylinder to deploy the actuator. In these prior art actuators, typically used with smaller RATs, the disk spring stack provides a high force early in the RAT deployment process, and the helical spring provides a much lower force to finish the deployment (see FIG. 3). These springs and an associated actuator piston fill most of the available volume inside the actuator cylinder. But when actuator loading (e.g., due to airflow loading on an associated door) is relatively high approximately mid-way through the deployment stroke, the helical spring may not be able to overcome the loading on the RAT and door assembly to fully deploy the RAT assembly because the disk spring load falls off to zero or near zero before the mid-way point in the deployment stroke.

Thus, it is desired to provide a relatively highly energy dense actuator assembly suitable for use with a RAT assembly having adequate force capacity approximately mid-way through an actuator stroke, be lightweight, and not require a larger actuator volume than conventional designs.

SUMMARY

In one aspect, an assembly includes an actuator assembly having a housing, a piston positioned at least partially within the housing and movable relative to the housing for an overall actuation stroke, a first spring operatively engaged between the piston and the housing to provide actuation biasing force therebetween, a second spring operatively engaged with the piston, and a spring guide. The spring guide is operatively engaged with the first spring and operatively engaged with the piston via a sliding connection. The spring guide is further configured to limit a stroke of the first spring such that the first spring contributes actuation biasing force between the piston and the housing for only a portion of the overall actuation stroke of the piston. An associated method is provided in another aspect.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In general, the present invention provides an actuator, suitable for use with ram air turbines (RATs) used in aerospace applications, that provides relatively large actuation force, is relatively lightweight, and has a relatively small volumetric footprint. An actuator according to the present invention can fit into approximately the same volume as a conventional, prior art actuator, while providing much more energy (i.e., deployment force) during approximately a first half of a deployment process, including approximately mid-way through the deployment process. The additional actuation force and/or improved deployment force distribution can help promote relatively smooth and assured deployment despite relatively high and possibly unpredictable loads, such as loads due to oncoming airflows. A traditional, prior art configuration having a light helical spring and a disk spring stack can be replaced by a new configuration according to an embodiment of the present invention having at least two relative strong helical springs, which can each help push against a piston to deploy the actuator. One of the coil springs can provide actuation force over only a limited portion of an overall actuation stroke, and another coil spring can provide actuation force over the entire actuation stroke. This means that all of the coil springs can work together to provide actuation force over a first fractional portion of the overall actuation stroke, such as up to approximately mid-stroke, while fewer (e.g., just one) of the coil springs can provide actuation force over another, remaining portion of the overall deployment stroke. Conventional actuator snubbing and downlock functions can still be provided in a known manner. Additional details, features and benefits of the present invention will be understood with reference to the entirety of the present disclosure, including the accompanying figures.

Figure 1:
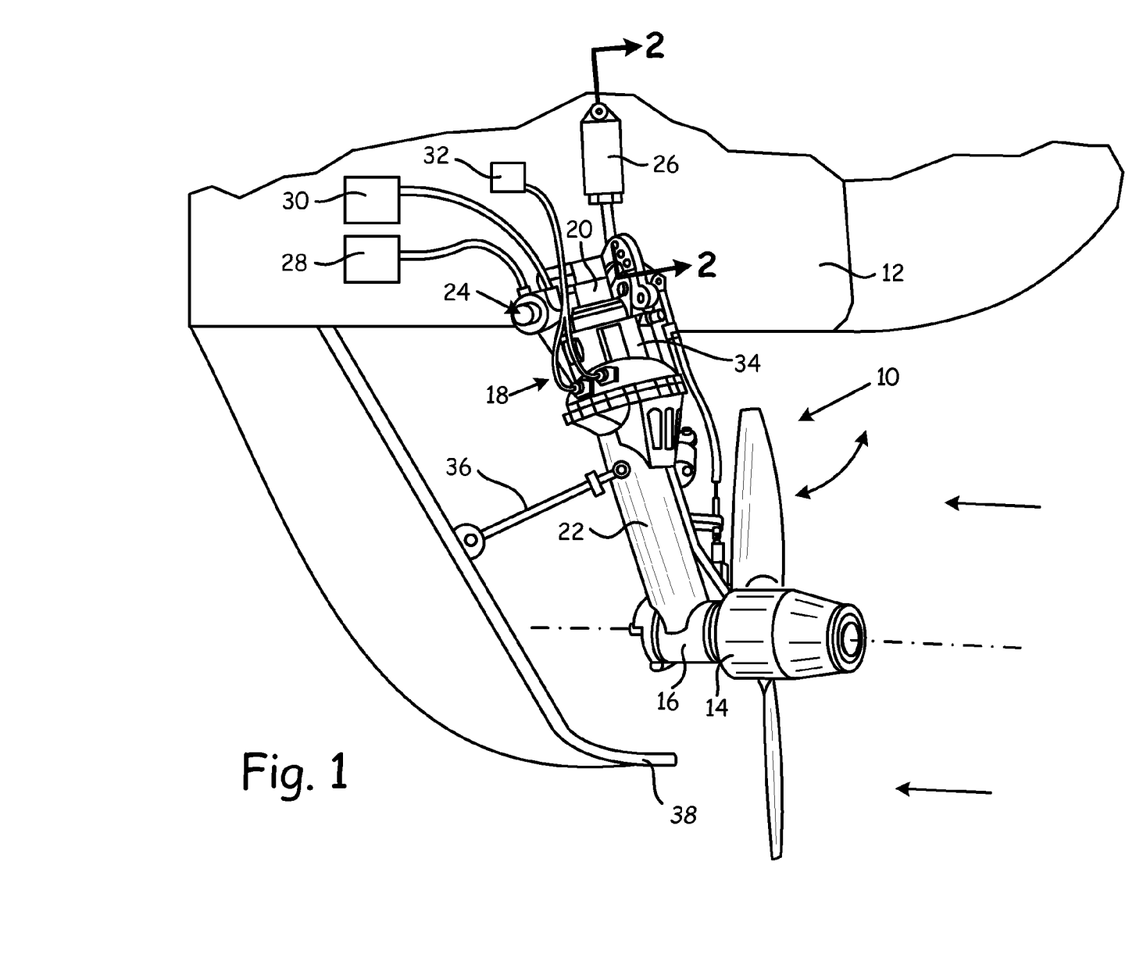
FIG. 1 is a perspective view of an embodiment of a ram air turbine (RAT) assembly.

FIG. 1 is a perspective view of an embodiment of a ram air turbine (RAT) assembly 10, which is mounted to an airframe 12, and which is deployable between a stowed position for storage when not in use and a deployed position to provide electric power and/or hydraulic pressure. FIG. 1 illustrates the RAT assembly 10 in a deployed position. The illustrated RAT assembly 10 includes a turbine 14, a gearbox 16, a generator 18, a hydraulic pump 20, a strut 22, a pivot post (or swivel post) 24, an actuator 26, a fluid supply location 28, a fluid delivery location 30, an electricity delivery location 32, a generator housing 34 (also simply called a "housing"), and a door linkage 36. Other components not specifically identified can also be included with the RAT assembly 10.

The turbine 14 is supported at or near the end of strut 22, which in turn is attached to the generator housing 34. The generator housing 34 is mounted to the airframe 12 with the swivel post 24, which allows pivotal movement of the turbine 14, strut 22, generator housing 34, etc. relative to the airframe 12 and can further provide fluid paths between the hydraulic pump 20 and both the fluid supply location 28 and the fluid delivery location 30. The generator 18 is disposed within the generator housing 34, and the hydraulic pump is supported on the generator housing 34. The generator 18 can generate electric power that can be supplied to the electricity delivery location 32. The hydraulic pump 20 can receive fluid (e.g., conventional hydraulic fluid) from the fluid supply 28 and can pump the fluid to various systems at the delivery location 30 that utilize pressurized fluid for operation.

During flight, the turbine 14 can rotate responsive to airflow along the outside of the airframe 12. Rotational power from the turbine 14 can be transmitted through the gearbox 16 to either or both the generator 18 and the hydraulic pump 20 for operation. The hydraulic pump 20 can be coupled to the generator 18 such that the hydraulic pump 20 rotates at the same speed as the generator 18. In alternative embodiments, the hydraulic pump 20 and the generator can be rotated at different speeds.

The actuator assembly 26 can be configured as a combination spring- and fluidically-actuated mechanism for selectively deploying and stowing the RAT assembly 10. An internal spring mechanism (not visible in FIG. 1) can provide a biasing force to the RAT 10 in order to deploy the RAT assembly 10 when a locking mechanism (e.g., locking pawl or uplock) is released (the locking mechanism is not specifically shown). A fluid (e.g., conventional hydraulic fluid) can be selectively introduced to a fluidic cylinder of the actuator assembly 26 to selectively provide force to stow the RAT assembly 10, and can act as a part of a snubbing mechanism to help control movement of the RAT assembly 10 during deployment, and/or provide other functions. Further details of the actuator assembly are described below.

As shown in the embodiment of FIG. 1, the actuator assembly 26 further actuates at least one door 38 that can cover a compartment in the airframe 12 in which the RAT assembly 10 can be stowed (the stowed position is not specifically illustrated). The door linkage 36 can mechanically connect the door 38 to the strut 22 or another suitable structure (e.g., the generator housing 34) of the RAT assembly 10. In this way, movement of the strut 22 accomplished using the actuator assembly 26 can be transmitted to the door 38 through the door linkage 36, such that the door 38 is concurrently and simultaneously moved by the actuator 26, relative to the airframe 12.

It should be noted that the RAT assembly 10 illustrated in FIG. 1 is shown merely by way of example and not limitation. Those of ordinary skill in the art will recognize that other RAT assembly configurations are possible. For instance, in further embodiments, either the generator 18 or the hydraulic pump 20 could be omitted entirely.

Figure 2A:
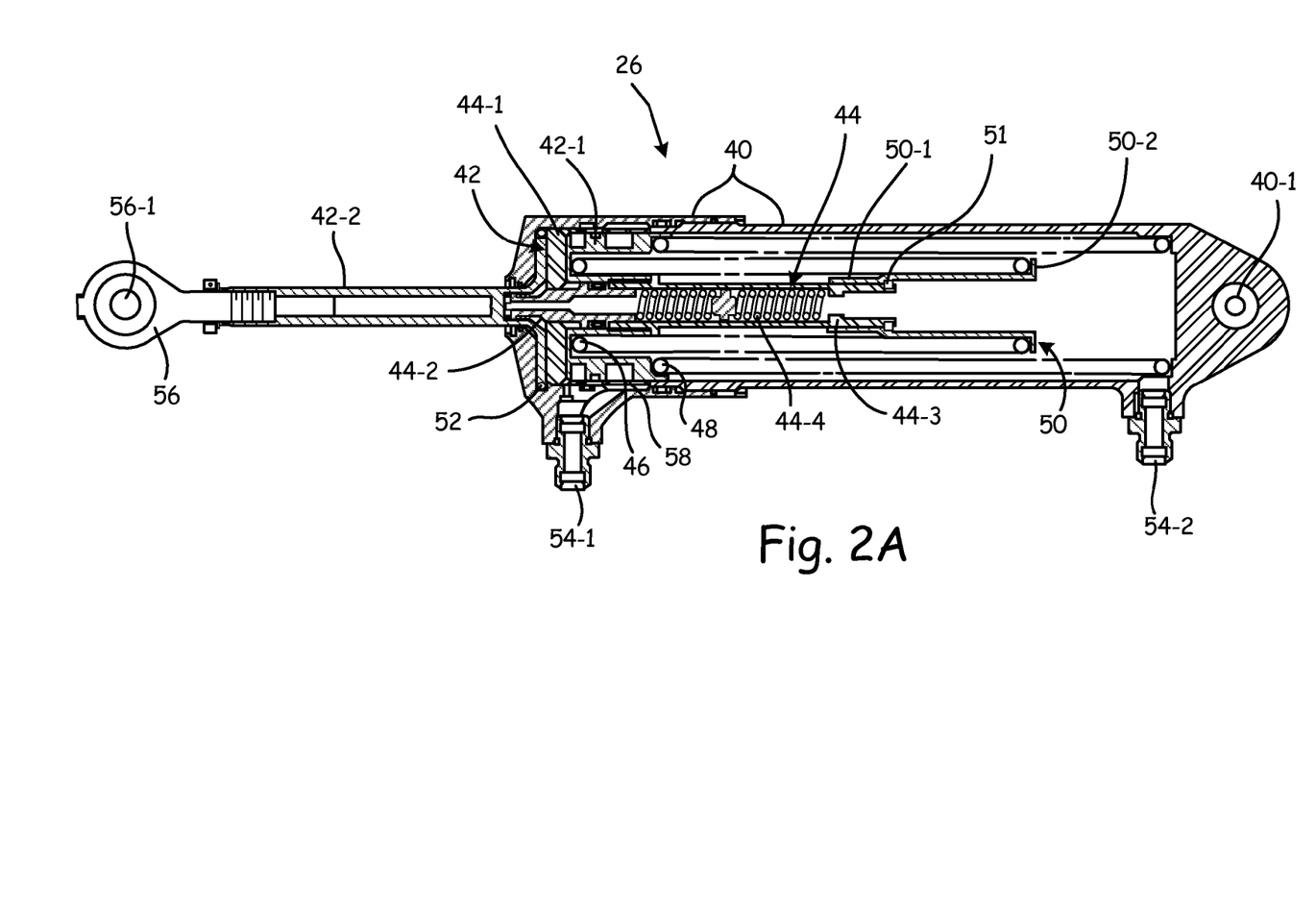
FIGS. 2A and 2B are cross-sectional views of one embodiment of an actuator assembly, taken along line 2-2 of FIG. 1, with FIG. 2A illustrating a deployed position and FIG. 2B illustrating a stowed position.
Figure 2B:
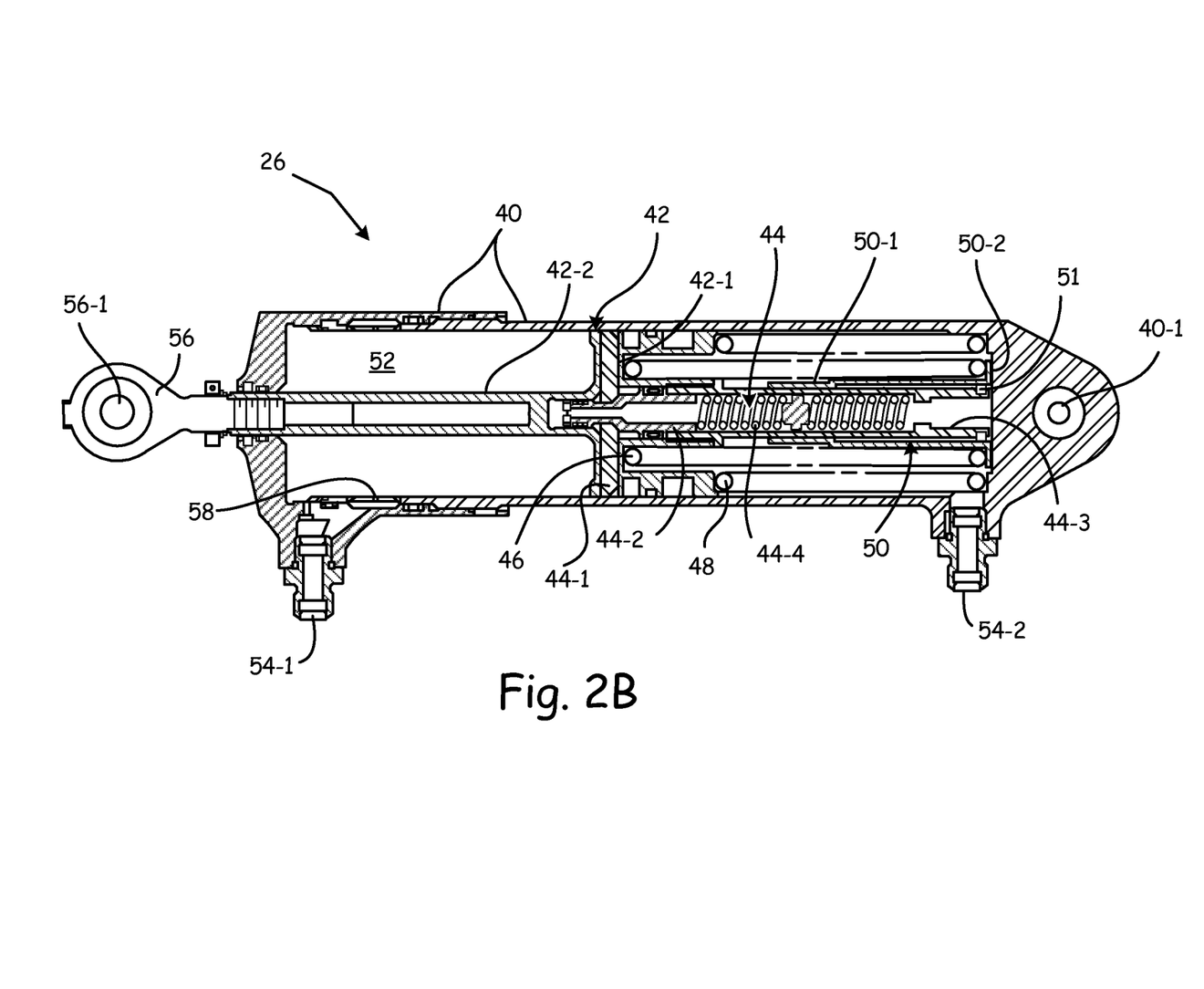

FIGS. 2A and 2B are cross-sectional views of one embodiment of the actuator assembly 26, taken along line 2-2 of FIG. 1, with FIG. 2A illustrating a deployed position and FIG. 2B illustrating a stowed position. The actuator assembly 26 of the illustrated embodiment includes a housing 40, a piston 42, a downlock subassembly 44, a first spring 46, a second spring 48, a spring guide 50, a stop 51, a fluid compartment 52, and fluid ports 54-1 and 54-2. The first and second springs 46 and 48 are shown schematically in FIGS. 2A and 2B, for simplicity. The actuator assembly 26 can further include a conventional uplock mechanism (not shown), such as a locking pawl, etc., to help maintain the RAT assembly 10 in a stowed position prior to selective release of the uplock mechanism.

The housing 40 can be configured as a two-part cylinder. A connection point 40-1 can be provided at one end of the housing 40, to allow mechanical connection of the housing 40 to a desired mounting location (e.g., to a portion of the RAT assembly 10 or to the airframe 12). The housing 40 can be made of a metallic material.

The piston 42 can be configured as a single unitary and monolithic piece that includes a downlock (or piston head) portion 42-1 and a rod portion 42-2. The downlock portion 42-1 can be positioned inside the housing 40, and the rod portion 42-2 can extend through the housing 40. A diameter of the downlock portion 42-1 can be relatively small relative to prior art actuator piston heads to help make room for the first (e.g., inner) spring 46. An end of the rod portion 42-2 of the piston 42 can be connected to an eyelet structure 56, in which a monoball or spherical bearing can be positioned. The eyelet structure 56 can provide a connection point 56-1, allowing the eyelet structure 56 and the piston 42 to be mechanically connected to a desired mounting location (e.g., to a portion of the RAT assembly 10 or to the airframe 12). Actuation of the actuator assembly 26 can produce displacement between the connection point 40-1 (associated with the housing 40) and the connection point 56-1 (associated with the piston 42). Movement of the piston 42, and therefore available displacement between the connection points 40-1 and 56-1, defines an overall actuation (or deployment) stroke.

Traditional, prior art pistons have a two piece design to minimize weight, with a piston head that is aluminum and a rod and downlock area made of steel. In contrast, an embodiment of the present invention can utilize a one piece piston 42, which can reduce expense and also free up more volume for the first (e.g., inner) spring 46, as discussed further below. In that way, an inner spring working cavity can be relatively large in both radial and axial directions, which helps allow use of a relatively large wire diameter for the first and second springs 46 and 48. Because spring load and stress are proportional to the third power of the wire diameter, a large wire diameter is desirable. Moreover, a longer cavity in the axial direction also helps allow a stronger spring to be used, because more axial room is generally required for the coils of large wire diameter spring.

The fluid compartment 52 can provide a working area for a suitable fluid (e.g., hydraulic fluid) used to selectively control operation of the actuator assembly 26. At least the downlock portion 42-1 of the piston 42 can be positioned along the fluid compartment 52, such that the fluid compartment 52 provides a volume for the fluid to be introduced to control the relative positions of the housing 40 and the piston 42, in a conventional manner. The fluid can pass into and out of the fluid compartment 52 through the housing 40 by way of the fluid ports 54-1 and 54-2, using a suitable pumping mechanism (not shown). In a conventional manner, the fluid in the fluid compartment 52 can provide a snubbing or dampening function during deployment of the RAT assembly 10 by passing fluid through snubbing orifices 58 and can further be used to selectively provide force to stow the RAT assembly 10. Hydraulic control of RAT actuators is well known, and such known methods can be readily applied to the actuator 26 of the present invention, as desired for particular applications.

The downlock subassembly 44 can be of any desired configuration, including known designs. In the illustrated embodiment, the downlock subassembly 44 includes wedges 44-1, a downlock piston 44-2, a downlock spring guide 44-3, and a spring assembly 44-4. In a conventional manner, the downlock piston 44-2 and the spring assembly 44-4 can move the wedges 44-1 radially outward when the actuator assembly 26 is in a fully deployed position (as shown in FIG. 2A) to selectively lock the piston 42 relative to the housing 40, thereby helping to lock the actuator assembly 26 in the fully deployed position for operation. The downlock piston 44-2 can have a reduced outer diameter and associated seal cross-section (relative to prior art downlock pistons) to help maximize available space for the springs 46 and 48. The threaded spring guide 44-3 can be threadably engaged with the piston 42 to assemble the components of the downlock assembly 44, with a threaded connection for the downlock spring guide 44-3 positioned radially inward of the first spring 46. The stop 51, described further below with respect to the spring guide 50, can be engaged with the downlock spring guide 44-3. Because downlock assemblies are well known in the art, further discussion here is unnecessary. Further, it should be understood that the particular downlock subassembly 44 illustrated in FIGS. 2A and 2B is provided merely by way of example and not limitation. Persons of ordinary skill in the art will appreciate that other downlock mechanisms can be utilized in further embodiments, or can be omitted entirely.

The first spring 46 and the second spring 48 can each be helical coil springs that cooperate to provide actuation force capable of deploying the actuator assembly 26, along with any connected deployable components such as the RAT assembly 10 and the door 38. The springs 46 and 48 can be held in compression when the RAT assembly 10 is in the stowed position, and the potential energy of the springs 46 and 48 released to provide deployment force when the uplock mechanism (e.g., locking pawl) is released (as already noted, the uplock mechanism is not specifically shown). The first and second springs 46 and 48 can each have relatively high spring load capacities. In one embodiment, round spring wires are used for one or both of the springs 46 and 48. Alternatively, square cross-section spring wires can be used for one or both of the springs 46 and 48 to provide even higher load capacity within the same envelope as a round wire spring. Titanium, and alloys thereof, can be used to make one or both of the springs 46 and 48 in a preferred embodiment, which offers a larger load capacity in the same envelope than stainless steel springs. An embodiment of the present invention can potentially be made less expensive, with a generally slightly larger diameter of the housing 40, using titanium for the second (e.g., outer) spring 48 and stainless steel for the first (e.g., inner) spring 46, or vice-versa. In still further embodiments, other materials such as stainless steel can be used for one or both of the springs 46 and 48, typically with corresponding adjustments to the diameter of the housing 40 to accommodate the necessary spring size for given material combinations.

In the illustrated embodiment, the springs 46 and 48 are coaxially and concentrically position with the first spring 46 positioned radially inward from (i.e., at least partially within and encircled by) the second spring 48. In one embodiment, the first and second springs 46 and 48 can be helical springs having coil shapes wound in opposite directions, which can help reduce a risk of interference as the springs 46 and 48 compress and/or expand. In the illustrated embodiment, as shown in FIG. 2B, a compressed, stowed axial length of the first spring is greater than that of the second spring 48, though other relationships are possible in further embodiments. First ends of each of the first and second springs 46 and 48 can each be operatively engaged with the piston 42, and the first end of the first spring 46 can be in physical contact with the downlock portion 42-1 of the piston 42. A second end of the first spring 46 located opposite the first end can be operatively engaged with the spring guide 50. A second end of the second spring 48 located opposite the first end can be operatively engaged with the housing 40, and can further be in physical contact with an interior surface of the housing 40. Persons of ordinary skill in the art will appreciate that relative relationships of the first and second springs 46 and 48 relative to the spring guide 50 can readily be reversed in alternative embodiments.

A relatively high spring load capacity for the springs 46 and 48, particularly at approximately mid-way through the overall actuation stroke, can be achieved using one or more of the following features and methods. The springs 46 and 48 can each be sized near a maximum allowable material stress level in the stowed position. Additionally, an outer diameter (OD) of the second (outer) spring 48 should be as large as possible within the housing 40 to help increase or maximize load capacity. A radial gap between the springs 46 and 48 should be as small as good practices allow so that the first (inner) spring 46 also has as large an OD possible. In determining the radial gap spacing, accommodations should be made for tolerances, spring bending and growth as the springs 46 and 48 compress. Furthermore, a relative high spring load capacity can be promoted by packing the coils of each of the first and second springs 46 and 48 as close together as possible (in the axial direction) when in the stowed position. In one embodiment, the stowed position coil spacing between coils of one or both of the springs 46 and 48 can be approximately 90% of a free spring coil spacing between the coils of the springs 46 and 48. Deployed spring coil spacing can be slightly less than the free spring coil spacing.

The spring guide 50 can be a sliding member that allows the first (e.g., inner) spring 46 to deploy as long as necessary, and then allows the first spring 46 to travel—unloaded to its minimum working height—with the piston 42 during a remainder of a deployment stroke. Use of the spring guide 50 helps prevent the first spring 46 from becoming misaligned during any portion of the deployment stroke. The spring guide 50 of the illustrated embodiment is configured as a generally sleeve-like member having a stop 50-1 and a flange 50-2. The stop 50-1 can be arranged at an inner diameter portion of the spring guide 50. The flange 50-2 can extend generally radially outward, and can be arranged at or near an opposite end of the spring guide 50 from the stop 50-1. The flange 50-2 can provide opposing contact surfaces for the first spring 46 and the housing 40, respectively, and can selectively transmit actuation biasing force from the first spring 46 to the housing 40 when in contact with the housing 40. The stop 50-1 can be arranged for sliding engagement with the second downlock piston 44-3 or other portion of the downlock subassembly 44, and can interact with the stop 51 to restrict axial movement of the spring guide 50 (relative to the downlock subassembly 44) during the deployment process. In that way the spring guide 50 can be operatively engaged with the piston 42 in an indirect manner, via the sliding engagement with at least a portion of the downlock subassembly 44 that moves with the piston 42. As shown in FIG. 2A, the deployment stroke of the actuator assembly 26 causes the stops 51 and 50-1 to contact each other, which in turn causes the spring guide 50 to translate in the axial direction and move the flange 50-2 away from the interior surface of the housing 40. In that way the spring guide 50 rests against the housing 40 for a fractional portion of the overall actuator deployment stroke, and travels with the piston 42 for a remaining portion of the overall actuator deployment stroke. Travel by the spring guide 50 limits an operative stroke of the first spring 46 to only a fractional portion (i.e., a percentage less than 100%) of a possible stroke, based on the overall actuation stroke of the piston 42, such that the first spring 46 contributes actuation biasing force between the piston 42 and the housing 40 for only a fractional portion of the overall actuation stroke of the piston 42. Specifically, when the flange 50-2 contacts the housing 40, the first spring 46 can provide a biasing force between the housing 40 and the piston 42, whereas when the stops 51 and 50-1 contact each other and the flange 50-2 of the spring guide 50 moves out of contact with (i.e., is spaced from) the housing 40, under the influence of force from the second spring 48, the first spring 46 can no longer contribute a biasing force between the housing 40 and the piston 42. In alternative embodiments, the spring guide 50 can be engaged with either spring 46 or 48, and can be engaged with any desired portion of the piston 42, the downlock subassembly 44 or any other suitable component of the actuator assembly 26 that can travel with the piston 40, and still provide a suitable stroke limit on the engaged spring 46 or 48.

During operation, the first and second springs 46 and 48 can work together to overcome an opposing load (i.e., loading on the actuator 26 from the RAT assembly 10, the door 38, etc.). More particularly, the first and second coil springs 46 and 48 coil springs can both provide actuation force over a first portion of the overall actuation stroke, up to a given threshold based on a stroke limit of the first spring 46 (e.g., up to approximately mid-stroke for complete deployment of the RAT assembly 10), while only the second spring 48 can provide actuation force over another, remaining portion of the overall deployment stroke (e.g., from approximately mid-stroke to full deployment stroke). In general, to help optimize performance, the first (e.g., inner) spring 46 can provide the most load capacity if only applying load for the minimum portion of the actuation stroke needed (compared to the total deployment stroke for the actuator 26), with the second (e.g., outer) spring 48 providing the remaining load capacity to finish the deployment stroke, or vice-versa. In that way limiting the stroke of the first spring 46 can provide numerous benefits, as explained further below.

Figure 3:
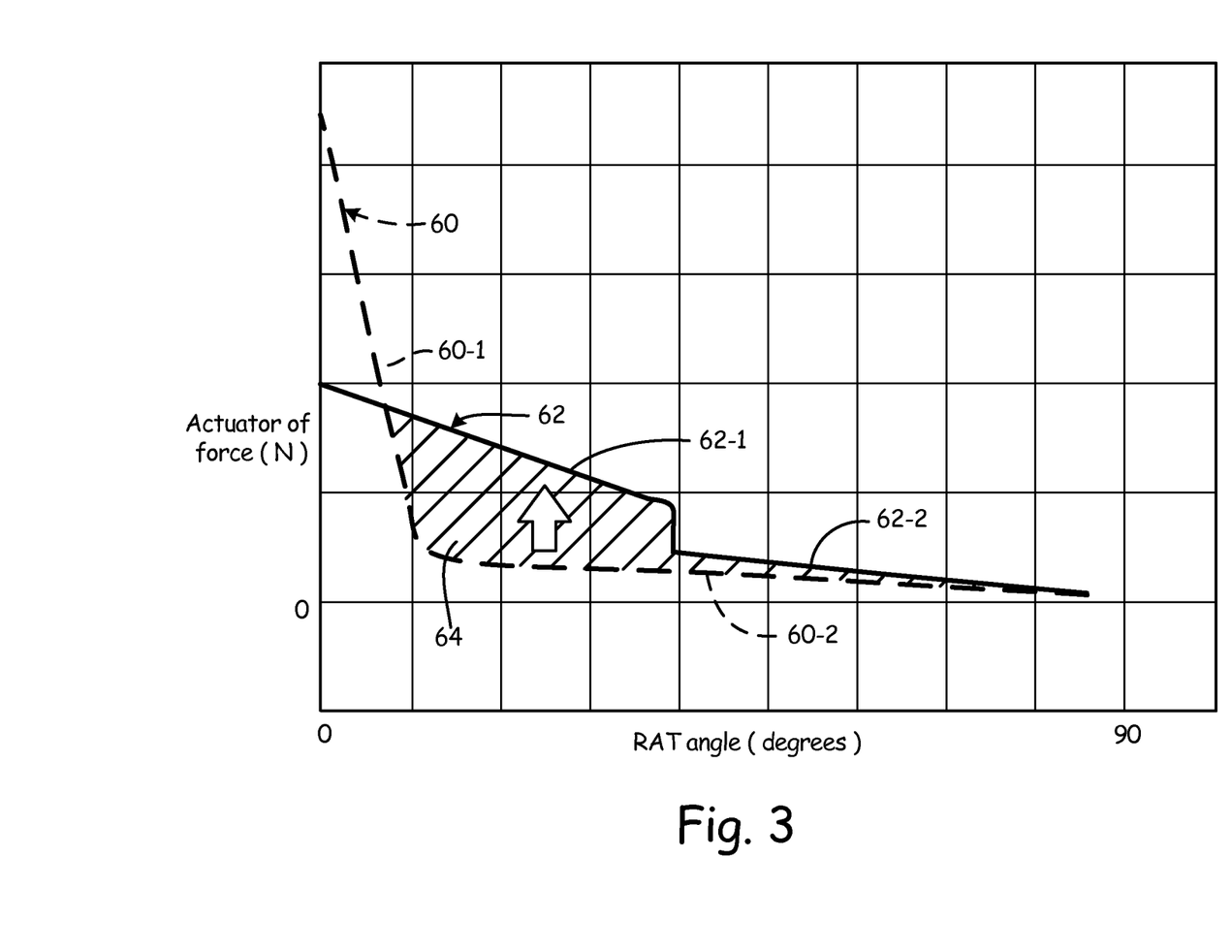
FIG. 3 is a graph illustrating actuator force vs. RAT angle for an actuator assembly of the present invention and for a prior art actuator.

FIG. 3 is an example graph illustrating actuator force vs. RAT angle for an embodiment of the actuator assembly 26 and for a prior art actuator utilizing a combination of stacked disc springs and a single, weak coil spring. Actuator force is given in newtons (N), with positive values indicating compressive forces, and represents total force output of the deployment spring assembly for a given actuator. Actuator force is "greater" (in absolute value) away from a zero value in the graph. RAT angle is given in degrees, and ranges from 0° in the stowed position to a full deployment angle, which will vary as desired for particular applications but is typically less than 90°.

Curve 60 illustrates actuator force vs. RAT angle for a prior art actuator utilizing a combination of stacked disc springs and a single coil spring. As shown in FIG. 3, the curve 60 has a "hockey stick" shape, with a large, steep slope in a relatively small first stroke region 60-1, generally characterized by force provided from the disc spring stack and the coil spring working together, followed by a large second stroke region 60-2 with a small and nearly flat slope, characterized by force provided from the weak coil spring. In the illustrated embodiment, the second stroke region 60-2 is many times (approximately 7×) greater than the first stroke region 60-1, such that the first stroke region 60-1 terminates well short of mid-stroke.

Curve 62 illustrates actuator force vs. RAT angle for an embodiment of the actuator assembly 26 utilizing two titanium coil springs 46 and 48. As shown in FIG. 3, the curve 62 has a stepped shape, with a first slope in a first stroke region 62-1, generally characterized by force provided from both of the springs 46 and 48, followed by a step-wise decrease in actuation force to a second stroke region 62-2 with a slightly smaller second slope, characterized by force provided from only the second spring 48. In the illustrated embodiment, the first and second stroke regions 62-1 and 62-2 are approximately equal, and the step-wise transition between the first and second stroke regions 62-1 and 62-2 occurs near a mid-stroke region. Thus, a region 64 of increased actuation force can be provided by the actuation assembly 26 over the prior art configuration, represented by area between the curves 60 and 62. The present inventor has discovered that the region 64 can be important in certain applications, because opposing loads on the actuator assembly 26 may be relatively high when the RAT assembly 10 and/or the door 38 have moved sufficiently to face substantial loads from oncoming airflow, etc. at or near mid-stroke.

Examples

Two prophetic example spring calculation cases will illustrate some benefits of limiting the stroke of the first (e.g., inner) spring 46 using the spring guide 50 according to an embodiment of the present invention, as compared to actuator configurations without a spring stroke limit.

Case 1:

Provide a hypothetical (first) spring with the same number of coils (i.e., turns of the helical spring) and wire diameter as the first spring 46 described above, but add additional axial clearance between the coils so the hypothetical spring can extend the full actuator stroke. The minimum (stowed) length is the same for the hypothetical spring and the first spring 46, but traditional spring calculations show that the stowed stress is 1.4 times higher for the hypothetical spring than the first spring 46, which is an unacceptably high stress.

Case 2:

Provide a hypothetical (first) spring having the maximum load capacity possible with reasonable stress values that fits the available minimum spring cavity, and uses the full actuator stroke. A wire diameter of the hypothetical spring is reduced to about 83% of the first spring 46 described above, and the load at the mid-stroke is reduced to about 74% of that of the first spring 46. The limited stroke first spring 46 thus provides more load during a fractional portion of the actuation stroke when it may be most needed.

Possible Benefits:

Persons of ordinary skill in the art will recognize that an actuator assembly 26 of the present invention can provide numerous advantages and benefits. Some examples of those advantages and benefits are as follows. The actuator assembly 26 can achieve relatively high actuation forces within a relatively limited volume, which means that the actuator assembly 26 can be used to replace a prior art actuator when flight testing reveals higher loads than anticipated without a need to reconfigure the airframe 12 or the RAT assembly 10. Use of titanium for one or both of the springs 46 and 48 is generally both lighter and stronger than the traditional steel spring materials in a prior art deployment actuator. Even an embodiment of the actuator assembly 26 using only steel for the springs 46 and 48 or a combination of different materials for the springs 46 and 48 is also superior to prior art configurations, because there is at most only a relatively small weight increase to offset the relatively large improvement in load capacity. The actuator assembly 26 can deploy faster at low temperatures due to the additional spring capacity. There is minimal increase to impact loading at the end of the deployment stroke of the actuator assembly 26 compared to a prior art configuration, because the relatively strong first (e.g., inner) spring 46 is not active at the end of stroke. Additional spring energy of the actuator assembly 26 (compared to a prior art actuator) from the first half of the deployment stroke can snubbed out by actuator snubbing orifices (along or part of the fluid cavity 52) so that an impact speed at end of travel of the piston 42 is almost the same. Furthermore, loads and stresses of the actuator assembly 26 when stowed are less compared to a prior art actuator with a combination of disk springs and a weak coil spring.

Discussion of Possible Embodiments

The following are non-exclusive descriptions of possible embodiments of the present invention.

An assembly can include an actuator assembly that includes a housing; a piston positioned at least partially within the housing and movable relative to the housing for an overall actuation stroke; a first spring operatively engaged between the piston and the housing to provide actuation biasing force therebetween; a second spring operatively engaged with the piston; and a spring guide operatively engaged with the first spring and operatively engaged with the piston via a sliding connection, wherein the spring guide is configured to limit a stroke of the first spring such that the first spring contributes actuation biasing force between the piston and the housing for only a fractional portion of the overall actuation stroke of the piston.

The assembly of the preceding paragraph can optionally include, additionally and/or alternatively, any one or more of the following features, configurations and/or additional components:

the first spring and the second spring can each comprise coil springs;

at least one of the first and second springs can comprise titanium;

at least one of the first and second springs can have a rectangular cross-sectional shape;

the first and second springs can be arranged coaxially, with the first spring positioned radially inward of the second spring;

the spring guide can include a stop configured to limit sliding movement of the spring guide relative to the piston; and a flange configured to engage the first spring and to selectively transmit actuation biasing force from the first spring to the housing;

the spring guide can be configured to travel with the piston for the fractional portion of the overall actuation stroke of the piston;

the second spring can be configured to contribute actuation biasing force between the piston and the housing for the entire overall actuation stroke of the piston;

the spring guide is configured to limit the stroke of the first spring to a limit, which can, for example, occur at or beyond mid-stroke of the overall actuation stroke of the piston or at any other desired position within the overall stroke;

a downlock subassembly engaged with the piston and configured to selectively lock the piston relative to the housing, wherein the spring guide is engaged with the downlock subassembly;

a deployable ram air turbine assembly engaged with the actuator assembly, wherein the actuator assembly provides actuation force for deployment of the ram air turbine assembly; and/or a door engaged with the ram air turbine assembly for common deployment.

A method for operating an actuator assembly having a piston and a housing can include: delivering actuation force between the piston and the housing with a first coil spring over a first portion of an overall piston actuation stroke; disengaging the first coil spring from the housing over a remaining portion of the overall piston actuation stroke, following the first portion of the overall piston actuation stroke; and delivering actuation force between the piston and the housing with a second coil spring over the entire overall piston actuation stroke.

The method of the preceding paragraph can optionally include, additionally and/or alternatively, any one or more of the following steps, features, and/or configurations:

the step of moving the first coil spring out of engagement with the housing over a remaining portion of the overall piston actuation stroke can include sliding a spring guide such that the spring guide travels with the piston;

moving a downlock subassembly with the piston, wherein the spring guide is engaged with a portion of the downlock subassembly; and/or deploying both a ram air turbine assembly and a door with the actuator assembly.

Summation

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
an actuator assembly that includes:
a housing;
a piston positioned at least partially within the housing and movable relative to the housing for an overall actuation stroke;
a first spring operatively engaged between the piston and the housing to provide actuation biasing force therebetween;
a second spring operatively engaged with the piston; and
a spring guide operatively engaged with the first spring and operatively engaged with the piston via a sliding connection, wherein the spring guide is configured to limit a stroke of the first spring such that the first spring contributes actuation biasing force between the piston and the housing for only a fractional portion of the overall actuation stroke of the piston.

2. The assembly of claim 1, wherein the first spring and the second spring each comprise coil springs.

3. The assembly of claim 2, wherein at least one of the first and second springs comprises titanium, and wherein at least one of the first and second springs has a rectangular cross-sectional shape.

4. The assembly of claim 2, wherein the first and second springs are arranged coaxially, with the first spring positioned radially inward of the second spring.

5. The assembly of claim 1, wherein the spring guide comprises:
a stop configured to limit sliding movement of the spring guide relative to the piston; and
a flange configured to engage the first spring and to selectively transmit actuation biasing force from the first spring to the housing.

6. The assembly of claim 1, wherein the spring guide is configured to travel with the piston for the fractional portion of the overall actuation stroke of the piston.

7. The assembly of claim 1, wherein the second spring is configured to contribute actuation biasing force between the piston and the housing for the entire overall actuation stroke of the piston.

8. The assembly of claim 1, wherein the spring guide is configured to limit the stroke of the first spring.

9. The assembly of claim 1 and further comprising:
a downlock subassembly engaged with the piston and configured to selectively lock the piston relative to the housing, wherein the spring guide is engaged with the downlock subassembly.

10. The assembly of claim 1 and further comprising:
a deployable ram air turbine assembly engaged with the actuator assembly, wherein the actuator assembly provides actuation force for deployment of the ram air turbine assembly.

11. The assembly of claim 10 and further comprising:
a door engaged with the ram air turbine assembly for common deployment.

12. A method for operating an actuator assembly having a piston and a housing, the method comprising:
delivering actuation force between the piston and the housing with a first coil spring over a first portion of an overall piston actuation stroke;
disengaging the first coil spring from the housing over a remaining portion of the overall piston actuation stroke, following the first portion of the overall piston actuation stroke, wherein the step of moving the first coil spring out of engagement with the housing over a remaining portion of the overall piston actuation stroke comprises:
sliding a spring guide such that the spring guide travels with the piston; and
delivering actuation force between the piston and the housing with a second coil spring over the entire overall piston actuation stroke.

13. The method of claim 12 and further comprising:
moving a downlock subassembly with the piston, wherein the spring guide is engaged with a portion of the downlock subassembly.

14. The method of claim 12 and further comprising:
deploying both a ram air turbine assembly and a door with the actuator assembly.

15. A method for operating an actuator assembly having a piston and a housing, the method comprising:
delivering actuation force between the piston and the housing with a first coil spring over a first portion of an overall piston actuation stroke;
disengaging the first coil spring from the housing over a remaining portion of the overall piston actuation stroke, following the first portion of the overall piston actuation stroke;
delivering actuation force between the piston and the housing with a second coil spring over the entire overall piston actuation stroke; and
deploying both a ram air turbine assembly and a door with the actuator assembly.

* * * * *